(12) United States Patent
Bin Ziad et al.

(10) Patent No.: US 12,281,540 B2
(45) Date of Patent: Apr. 22, 2025

(54) WIRELESS WELLBORE DRIFTING AND SURVEILLANCE

(71) Applicant: Saudi Arabian Oil Company, Dhahran (SA)

(72) Inventors: Abdullah M. Bin Ziad, Udhailiyah (SA); Fehead M. Al-Subaie, Udhailiyah (SA); Abdulmajeed M. Alotaibi, Udhailiyah (SA); Ahmed H. Mahsoon, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/325,311

(22) Filed: May 30, 2023

(65) Prior Publication Data
US 2024/0401436 A1 Dec. 5, 2024

(51) Int. Cl.
*E21B 37/02* (2006.01)
*E21B 47/07* (2012.01)
*E21B 47/12* (2012.01)
*E21B 47/26* (2012.01)
(Continued)

(52) U.S. Cl.
CPC ............ *E21B 37/02* (2013.01); *E21B 47/07* (2020.05); *E21B 47/12* (2013.01); *E21B 47/26* (2020.05); *G01L 19/0092* (2013.01); *G01L 19/086* (2013.01); *E21B 2200/08* (2020.05)

(58) Field of Classification Search
CPC .......... E21B 37/02; E21B 47/07; E21B 47/12; E21B 47/26; E21B 2200/08; G01L 19/0092; G01L 19/086
See application file for complete search history.

(56) References Cited

U.S. PATENT DOCUMENTS

| 8,430,173 B2 | 4/2013 | Todd et al. | |
|---|---|---|---|
| 2015/0239795 A1* | 8/2015 | Doud | C06B 45/32 149/7 |
| 2019/0316459 A1* | 10/2019 | Chen | E21B 43/26 |

(Continued)

OTHER PUBLICATIONS

Al-Hajri et al., "The Sensor Ball Revolutionizes Wireline Operations," Prepared for presentation at the ADIPEC held in Abu Dhabi, UAE, Oct. 31-Nov. 3, 2022, 8 pages.

(Continued)

*Primary Examiner* — Giovanna Wright
*Assistant Examiner* — Ronald R Runyan
(74) *Attorney, Agent, or Firm* — Fish & Richardson P.C.

(57) ABSTRACT

An apparatus includes a dissolvable gauge cutter, a temperature sensor, and a pressure sensor. The dissolvable gauge cutter is made of a dissolvable alloy. The dissolvable gauge cutter is configured to be disposed within and travel through a tubular installed within a wellbore. The dissolvable gauge cutter is configured to dislodge solids from an inner wall of the tubular as the dissolvable gauge cutter travels through the tubular down to a specified depth within the wellbore. The dissolvable gauge cutter is configured to completely dissolve after reaching the specified depth. The temperature is configured to measure a temperature of a surrounding fluid as the dissolvable gauge cutter travels downhole through the tubular to the specified depth. The pressure sensor is configured to measure a pressure of the surrounding fluid as the dissolvable gauge cutter travels downhole through the tubular to the specified depth.

20 Claims, 7 Drawing Sheets

(51) Int. Cl.
*G01L 19/00* (2006.01)
*G01L 19/08* (2006.01)

(56) References Cited

U.S. PATENT DOCUMENTS

2020/0131899 A1\* 4/2020 Chen ........................ E21B 47/10
2021/0238982 A1\* 8/2021 Schulte ................... E21B 33/12

OTHER PUBLICATIONS

Ambrus, "Modeling and Control of Managed Pressure Drilling Operations," Dissertation for the Degree of Doctor of Philosophy, University of Texas at Austin, May 2017, 310 pages.

\* cited by examiner

200A

WIRELESS WELLBORE DRIFTING AND SURVEILLANCE

TECHNICAL FIELD

This disclosure relates to wellbore drifting and surveillance.

BACKGROUND

Gauge cutters are commonly used in petroleum industry for ensuring accessibility of tubing/casing/liner prior to running any other sub-surface tools inside the well. A gauge cutter is a tool with a round, open-ended bottom which is milled to an accurate size. Large openings above the bottom of the tool allow for fluid bypass while running in the hole. Often a gauge ring will be the first tool run on a slickline operation. A gauge cutter can also be used to remove light paraffin that may have built up in the casing and drift runs also. For sampling or removing the paraffin or any other mechanical debris, formation sand, scale sand bailer is used.

SUMMARY

This disclosure describes technologies relating to wellbore drifting and surveillance. Certain aspects of the subject matter described can be implemented as an apparatus. The apparatus includes a dissolvable gauge cutter, a temperature sensor, and a pressure sensor. The dissolvable gauge cutter is made of an alloy. The alloy includes magnesium and at least one of zinc, aluminum, iron, tungsten, nickel, manganese, or copper. The dissolvable gauge cutter is configured to be disposed within and travel through a tubular installed within a wellbore formed in a subterranean formation. The dissolvable gauge cutter is configured to dislodge solids from an inner wall of the tubular as the dissolvable gauge cutter travels through the tubular down to a specified depth within the wellbore. The dissolvable gauge cutter is configured to completely dissolve after reaching the specified depth. The temperature sensor is configured to travel with the dissolvable gauge cutter. The temperature is configured to measure a temperature of a surrounding fluid as the dissolvable gauge cutter travels downhole through the tubular to the specified depth. The pressure sensor is configured to travel with the dissolvable gauge cutter. The pressure sensor is configured to measure a pressure of the surrounding fluid as the dissolvable gauge cutter travels downhole through the tubular to the specified depth.

This, and other aspects, can include one or more of the following features. The apparatus can include a distance sensor. The distance sensor can be configured to travel with the dissolvable gauge cutter. The distance sensor can be configured to measure a distance between the distance sensor and a surface location. The temperature sensor can be dissolvable and made of the alloy. The pressure sensor can be dissolvable and made of the alloy. The distance sensor can be dissolvable and made of the alloy. The apparatus can include a controller. The controller can be configured to travel with the dissolvable gauge cutter. The controller can be wirelessly and communicatively coupled to the temperature sensor. The controller can be wirelessly and communicatively coupled to the pressure sensor. The controller can be wirelessly and communicatively coupled to the distance sensor. The controller can be configured to receive the measured temperature from the temperature sensor. The controller can be configured to receive the measured pressure from the pressure sensor. The controller can be configured to receive the measured distance from the distance sensor. The controller can be configured to wirelessly transmit the measured temperature to the surface location. The controller can be configured to wirelessly transmit the measured pressure to the surface location. The controller can be configured to wirelessly transmit the measured distance to the surface location. The controller can be configured to store the measured temperature in a memory of the controller. The controller can be configured to store the measured pressure in the memory of the controller. The controller can be configured to store the measured distance in the memory of the controller. The controller can be configured to release from the dissolvable gauge cutter in response to dissolution of the dissolvable gauge cutter. The controller can have a density that is lighter than the surrounding fluid, such that the controller is configured to float back to the surface location after the dissolvable gauge cutter has dissolved. The apparatus can include a second dissolvable gauge cutter. The second dissolvable gauge cutter can be made of a second alloy. The second alloy can include magnesium and at least one of zinc, aluminum, iron, tungsten, nickel, manganese, or copper. The second dissolvable gauge cutter can be configured to reversibly couple to the dissolvable gauge cutter. The second dissolvable gauge cutter can be configured to ensure a second minimum inner diameter down to a second specified depth within the wellbore. The second dissolvable gauge cutter can be configured to completely dissolve after reaching the second specified depth. The second minimum inner diameter can be less than the minimum inner diameter. The second specified depth can be deeper than the specified depth. The second dissolvable gauge cutter can be configured to dissolve at a slower rate in comparison to the dissolvable gauge cutter.

Certain aspects of the subject matter described can be implemented as an apparatus. The apparatus includes a first dissolvable gauge cutter, a second dissolvable gauge cutter, a temperature sensor, a pressure sensor, and a distance sensor. The first dissolvable gauge cutter is made of a first alloy. The first alloy includes magnesium and at least one of zinc, aluminum, iron, tungsten, nickel, manganese, or copper. The first dissolvable gauge cutter is configured to be disposed within and travel through a tubular installed within a wellbore formed in a subterranean formation. The dissolvable gauge cutter is configured to dislodge solids from an inner wall of the tubular as the first dissolvable gauge cutter travels through the tubular down to a first specified depth within the wellbore to ensure a first minimum inner diameter down to the first specified depth. The first dissolvable gauge cutter is configured to completely dissolve after reaching the first specified depth. The second dissolvable gauge cutter is reversibly coupled to the first dissolvable gauge cutter. The second dissolvable gauge cutter is made of a second alloy. The second alloy includes magnesium and at least one of zinc, aluminum, iron, tungsten, nickel, manganese, or copper. The second dissolvable gauge cutter is configured to ensure a second minimum inner diameter down to a second specified depth within the wellbore. The second dissolvable gauge cutter is configured to completely dissolve after reaching the second specified depth. The temperature sensor is configured to travel with the second dissolvable gauge cutter. The temperature sensor is configured to measure a temperature of a surrounding fluid as the second dissolvable gauge cutter travels downhole to the second specified depth. The pressure sensor is configured to travel with the second dissolvable gauge cutter. The pressure sensor is configured to measure a pressure of the surrounding fluid as the apparatus travels downhole to the second specified depth.

The distance sensor is configured to travel with the second dissolvable gauge cutter. The distance sensor is configured to measure a distance between the distance sensor and a surface location.

This, and other aspects, can include one or more of the following features. The apparatus can include a controller. The controller can be configured to travel with the second dissolvable gauge cutter. The controller can be wirelessly and communicatively coupled to the temperature sensor. The controller can be wirelessly and communicatively coupled to the pressure sensor. The controller can be wirelessly and communicatively coupled to the distance sensor. The controller can be configured to receive the measured temperature from the temperature sensor. The controller can be configured to receive the measured pressure from the pressure sensor. The controller can be configured to receive the measured distance from the distance sensor. The controller can be configured to wirelessly transmit the measured temperature to the surface location. The controller can be configured to wirelessly transmit the measured pressure to the surface location. The controller can be configured to wirelessly transmit the measured distance to the surface location. The controller can be configured to store the measured temperature in a memory of the controller. The controller can be configured to store the measured pressure in the memory of the controller. The controller can be configured to store the measured distance in the memory of the controller. The controller can be configured to release from the second dissolvable gauge cutter in response to dissolution of the second dissolvable gauge cutter. The controller can have a density that is lighter than the surrounding fluid, such that the controller is configured to float back to the surface location after the first dissolvable gauge cutter and the second dissolvable gauge cutter have dissolved. The second minimum inner diameter can be less than the first minimum inner diameter. The second specified depth can be deeper than the first specified depth. The second dissolvable gauge cutter can be configured to dissolve at a slower rate in comparison to the first dissolvable gauge cutter.

Certain aspects of the subject matter described can be implemented as a method. A dissolvable gauge cutter is lowered through a tubular installed within a wellbore formed in a subterranean formation. The dissolvable gauge cutter made of an alloy. The alloy includes magnesium and at least one of zinc, aluminum, iron, tungsten, nickel, manganese, or copper. The dissolvable gauge cutter dislodges solids from an inner wall of the tubular as the dissolvable gauge cutter travels through the tubular to a specified depth within the wellbore to ensure a minimum inner diameter of the tubular. A temperature sensor measures a temperature of a surrounding fluid as the dissolvable gauge cutter travels downhole through the tubular to the specified depth. A pressure sensor measures a pressure of the surrounding fluid as the dissolvable gauge cutter travels downhole through the tubular to the specified depth. The dissolvable gauge cutter completely dissolves after reaching the specified depth.

This, and other aspects, can include one or more of the following features. A distance sensor can measure a distance between the distance sensor and a surface location as the dissolvable gauge cutter travels downhole through the tubular to the specified depth. A controller can receive the measured temperature from the temperature sensor. The controller can receive the measured pressure from the pressure sensor. The controller can receive the measured distance from the distance sensor. The controller can store the measured temperature in a memory of the controller. The controller can store the measured pressure in the memory of the controller. The controller can store the measured distance in the memory of the controller. The measured temperature can be received at the surface location. The measured pressure can be received at the surface location. The measured distance can be received at the surface location. The controller can have a density that is lighter than the surrounding fluid. The controller can float back to the surface location after the dissolvable gauge cutter has reached the specified depth and dissolved. Receiving the measured temperature at the surface location can include receiving the measured temperature from the controller after the controller has floated back to the surface location. Receiving the measured pressure at the surface location can include receiving the measured pressure from the controller after the controller has floated back to the surface location. Receiving the measured distance at the surface location can include receiving the measured distance from the controller after the controller has floated back to the surface location. The dissolvable gauge cutter can be reversibly coupled to a second dissolvable gauge cutter. The second dissolvable gauge cutter can be made of a second alloy. The second alloy can include magnesium and at least one of zinc, aluminum, iron, tungsten, nickel, manganese, or copper. The second dissolvable gauge cutter can be released from the dissolvable gauge cutter after the dissolvable gauge cutter has reached the specified depth within the wellbore. The second dissolvable gauge cutter can dislodge solids from a second inner wall of a second tubular installed within the wellbore as the second dissolvable gauge cutter travels through the second tubular to a second specified depth within the wellbore to ensure a second minimum inner diameter of the second tubular. The second dissolvable gauge cutter can completely dissolve after reaching the second specified depth. The second minimum inner diameter can be less than the first minimum inner diameter. The second specified depth can be deeper than the first specified depth. The second dissolvable gauge cutter can dissolve at a slower rate in comparison to the dissolvable gauge cutter.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
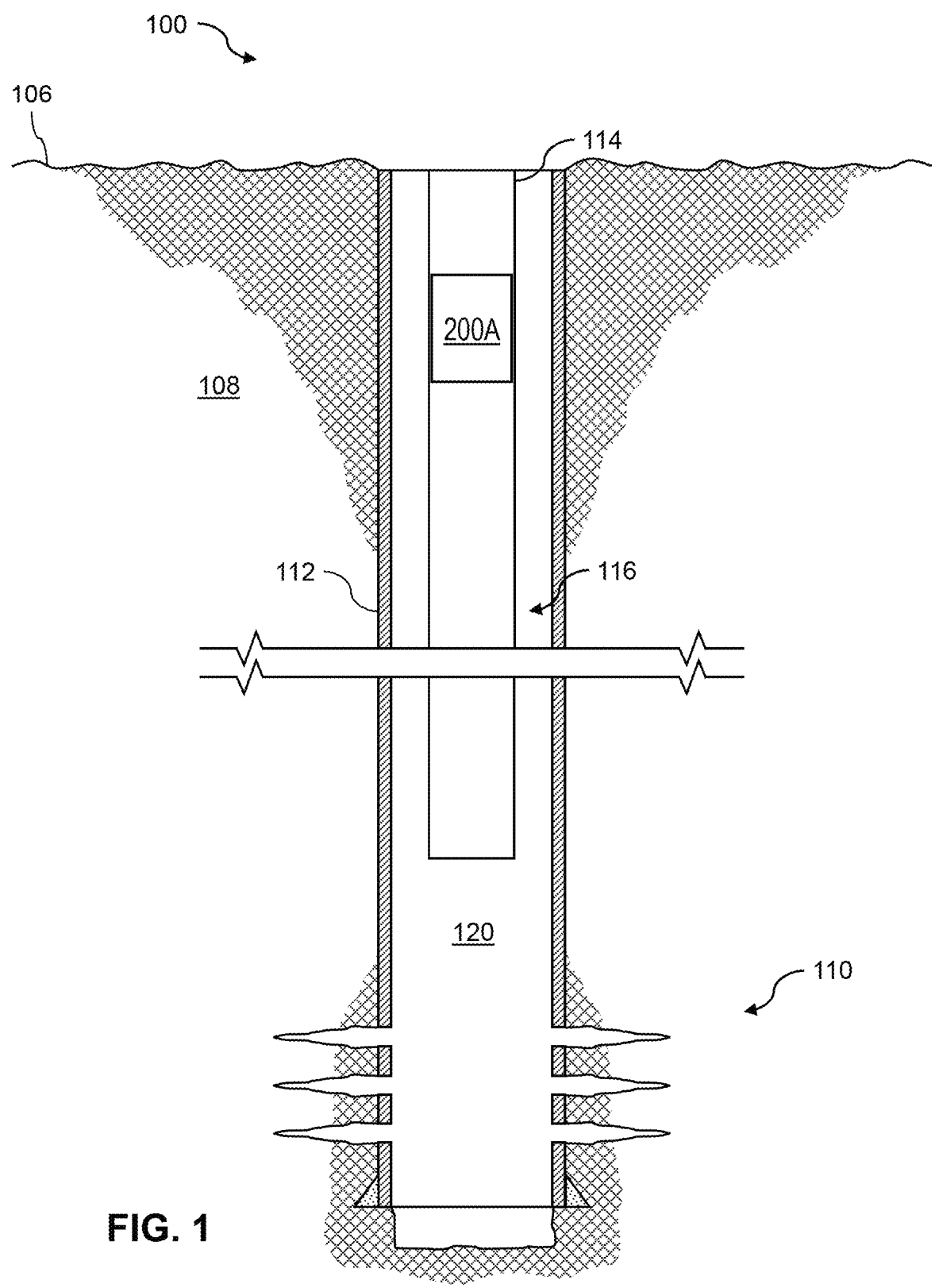
FIG. 1 is a schematic diagram of an example well.

This disclosure describes pipe drifting and pressure/temperature logging in downhole operations. The apparatus includes a dissolvable gauge cutter that can be used to drift pipe that has been installed in a wellbore. The apparatus can include a pressure sensor, a temperature sensor, or both. The sensors can be dissolvable or retrievable. In cases in which the sensors are dissolvable, the sensors can wirelessly communicate measured data to the surface. In cases in which the sensors are retrievable, the sensors can measure and store data while they are run in hole and then float back to the surface where the data can be retrieved and analyzed. In some implementations, the apparatus includes a gyroscopic sensor coupled to a controller. In such implementations, the gyroscopic sensor can measure spin rate, 3D trajectory, and rotational axis of the gauge cutter as it is deployed downhole, and the controller can wirelessly communicate the measured data to the surface. In some implementations, the apparatus includes a laser meter that can emit light and detect a reflection of the emitted light from the surface to determine downhole depth of the apparatus. In some implementations, the apparatus includes two gauge cutters of different sizes. The smaller gauge cutter can be at least partially disposed within the bigger gauge cutter. The bigger gauge cutter can be configured to dissolve at a faster rate in comparison to the smaller gauge cutter in response to exposure to downhole fluids in the wellbore. If the bigger gauge cutter reaches a shallower depth than desired, then the smaller gauge cutter can detach from the bigger gauge cutter and reach a deeper depth in the well to identify a maximum reachable depth.

The subject matter described in this disclosure can be implemented in particular implementations, so as to realize one or more of the following advantages. At least a portion of (for example, a majority of or the entirety of) the apparatuses described herein can be made of materials that are dissolvable in response to exposure to downhole fluids residing in wells formed in subterranean formations. As such, the apparatuses described herein can be lowered into wells to perform drifting operations and/or well surveillance operations independent of the use of wireline well intervention operations and/or equipment. Further, certain implementations of the apparatuses described herein can be left in the well after completion of such drifting and/or surveillance operations without requiring retrieval operations due to the dissolving capability of the apparatuses. In cases where a portion of the apparatus is not dissolvable in the downhole fluids, such portion(s) of the apparatus can be made to be less dense than the downhole fluids residing in the well, so that such portion(s) of the apparatus can float back to the surface without requiring retrieval operations. Thus, the apparatuses described herein can save on operating costs and time in comparison to conventional equipment that require wireline operations and/or retrieval operations after drifting and/or surveillance operations have been completed.

FIG. 1 depicts an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In particular, casing 112 is commercially produced in a number of common sizes specified by the American Petroleum Institute (the "API"), including 4-½, 5, 5-½, 6, 6-⅝, 7, 7-⅝, 7-¾, 8-⅝, 8-¾, 9-⅝, 9-¾, 9-⅞, 10-¾, 11-¾, 11-⅞, 13-⅜, 13-½, 13-⅝, 16, 18-⅝, and 20 inches, and the API specifies internal diameters for each casing size. In some implementations, the casing 112 is omitted or ceases in the region of the subterranean zone of interest 110. This portion of the well 100 without casing is often referred to as "open hole."

A tubular 114 can be installed in the well 100 within the inner bore 116 of the casing 112. The tubular 114 can, for example, be a production tubing. Although shown in FIG. 1 as including one tubular 114, the well 100 can include additional tubulars. Prior to completing the well 100 and commencing production of fluids from the well 100 or injecting fluids into the well 100, drifting and surveillance operations can be performed to ensure that an inner diameter of the well 100 (for example, an inner diameter of the tubular 114) is large enough (within suitable tolerances) to satisfy minimum-diameter specifications, such that tools and/or other tubulars can be run through the tubular 114. As shown in FIG. 1, an apparatus 200A can be lowered into and travel through the tubular 114 that has been installed in the well 100. The apparatus 200A can implement drifting operations and well surveillance operations. Although shown in FIG. 1 as apparatus 200A, the apparatus 200A can optionally be replaced with the apparatus 200B (shown in FIG. 2B and described in more detail later) to perform the same or similar operations.

Figure 2A:
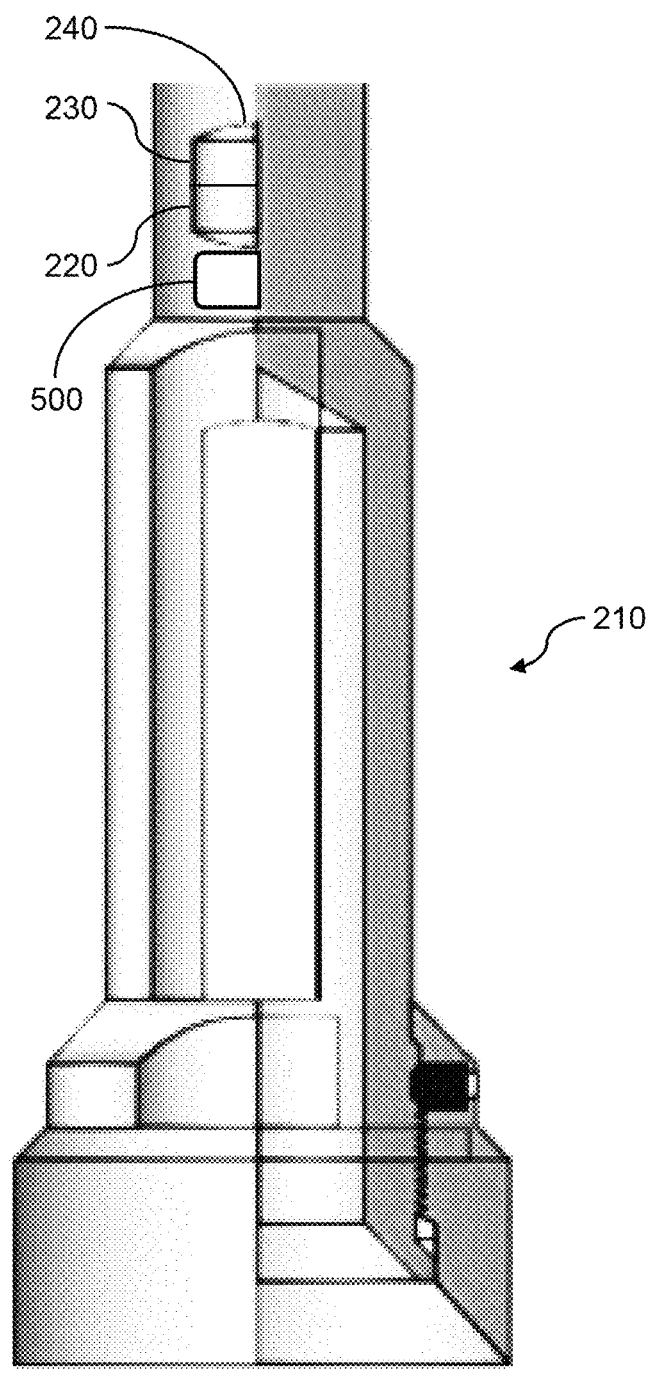
FIG. 2A is a schematic diagram of an example apparatus that can implement drifting and surveillance operations in the well of FIG. 1.

FIG. 2A is a schematic diagram of an example apparatus 200A that can implement drifting and surveillance operations in the well 100. The apparatus 200A includes a dissolvable gauge cutter 210, a temperature sensor 220, and a pressure sensor 230. The apparatus 200A is configured to be deployed in the well 100. For example, the apparatus 200A can be lowered into the well 100. The apparatus 200A is configured to perform drifting operations in the well 100. For example, the apparatus 200A is configured to be deployed through a tubular (such as the tubular 114) to ensure a minimum inner diameter of the tubular 114. In some implementations, as shown in FIG. 2A, the apparatus 200A includes a distance sensor 240. In some implementations, as shown in FIG. 2A, the apparatus 200A includes a controller 500. The apparatus 200A is configured to perform surveillance operations in the well 100. For example, the sensors (220, 230, 240) of the apparatus 200A can measure various properties and/or conditions (such as pressure, temperature, distance) as the apparatus 200a travels downhole in the well 100. The controller 500 can store the measured data, for example, in a memory. In some implementations, the controller 500 is configured to, while the apparatus 200A is downhole within the well 100, wirelessly transmit the measured data to an equipment (such as another controller) located at the surface 106.

The dissolvable gauge cutter 210 is made of a dissolvable alloy. The dissolvable alloy includes magnesium and at least one of zinc, aluminum, iron, tungsten, nickel, manganese, or copper. For example, the dissolvable alloy can include magnesium, zinc, and manganese. In some implementations, the dissolvable alloy has a magnesium content (by weight) in a range of from about 70% to about 95%, from about 80% to about 95%, or from about 85% to about 90%. In some implementations, the dissolvable alloy has a zinc content (by weight) in a range of from about 2% to about 20%, from about 5% to about 15%, or from about 5% to about 10%. In some implementations, the dissolvable alloy has a manganese content (by weight) in a range of from about 0.1% to about 10%, from about 0.5% to about 5%, or from about 1% to about 3%. Magnesium-based alloys can be used to make dissolvable portions of the apparatus 200A because magnesium-based alloys are resistant to corrosion and capable of dissolving in various types of downhole fluids, especially at the high temperatures and pressures that are typical in downhole environments. The inclusion of zinc and manganese to such dissolvable alloys can improve the alloy's mechanical properties (such as strength) and can improve corrosion resistance. When exposed to downhole fluids (such as the surrounding fluid 120) at downhole conditions in the well 100, the dissolvable alloy will begin to dissolve. The rate of dissolution of the dissolvable alloy can be controlled, for example, by adjusting the composition of the dissolvable alloy, by adjusting the size of the component made of the dissolvable alloy, by adjusting the shape of the component made of the dissolvable alloy, or any combinations of these, prior to deployment of the apparatus 200A into the well 100.

Magnesium is highly soluble in typical downhole fluids, and magnesium-based alloys can exhibit predictable dissolution behavior and can be tailored to be compatible and suitable for specific well conditions that can be expected in the particular well in which the apparatus 200A is to be deployed for drifting and surveillance operations. Zinc is also highly soluble in typical downhole fluids, and zinc-based alloys can be implemented in a range of applications, such as in frac plugs and bridge plugs. Aluminum exhibits high strength and resistance to corrosion, and aluminum-based alloys can exhibit predictable dissolution behavior and can be tailored to be compatible and suitable for specific well conditions that can be expected in the particular well in which the apparatus 200A is to be deployed for drifting and surveillance operations. Iron is less soluble in typical well fluids (for example, in comparison to magnesium), and iron can be included in the dissolvable alloy to decrease the dissolution rate of the dissolvable alloy in response to exposure to downhole fluids. Tungsten is a heavy metal which can be included in the dissolvable alloy to provide additional weight and/or strength. Tungsten-based alloys can exhibit predictable dissolution behavior and can be tailored to be compatible and suitable for specific well conditions that can be expected in the particular well in which the apparatus 200A is to be deployed for drifting and surveillance operations. Nickel is less soluble in typical well fluids (for example, in comparison to magnesium), and nickel can be included in the dissolvable alloy to decrease the dissolution rate of the dissolvable alloy in response to exposure to downhole fluids. Manganese is a strong, brittle, and hard metal that is resistant to wear and corrosion. When added to an alloy (such as steel), manganese can improve the alloy's tensile strength, ductility, and hardenability, which can be useful for implementation in high-stress applications, such as construction, mining, and transportation. Inclusion of manganese in the dissolvable alloy can also mitigate and/or eliminate the formation of impurities in the alloy, such as sulfur and phosphorus, both of which can weaken the integrity of the alloy. Inclusion of manganese in the dissolvable alloy can improve mechanical properties and corrosion resistance of the alloy. For example, inclusion of manganese in the dissolvable alloy can enhance the alloy's strength and toughness, making the alloy more resistant to deformation and fracture under the high pressure and temperature conditions typically encountered in downhole environments. Manganese can, for example, be included in small amounts (for example, up to about 3% by weight of the dissolvable alloy) to improve the mechanical properties of the alloy without hindering the dissolving capability of the alloy. Copper is a soft, malleable, and ductile metal that is conductive of heat and electricity. When added to an alloy (such as steel), copper can improve the alloy's strength, hardness, and resistance to wear and corrosion. Inclusion of copper in the alloy can also enhance the thermal and electrical conductivity of the alloy, which can be useful for implementation in electrical wiring, heat exchangers, and electronics.

The dissolvable gauge cutter 210 is configured to be disposed within and travel through the tubular 114 that is installed within the wellbore of the well 100. The dissolvable gauge cutter 210 is configured to dislodge solids from an inner wall of the tubular 114 as the dissolvable gauge cutter 210 travels through the tubular 114 down to a specified depth within the wellbore. Thus, the dissolvable gauge cutter 210 can dislodge, scrape, and/or clean debris from the inner wall of the tubular 114 or an inner wall of another tubular structure in the well 100. The dissolvable gauge cutter 210 can include a cutter blade that is configured to dislodge solids from the inner wall of the tubular 114 as the dissolvable gauge cutter 210 travels through the tubular 114 down to the specified depth within the wellbore. The cutter blade can have an outer diameter that corresponds to the minimum inner diameter that is required through the tubular 114. The cutter blade can mirror the cross-sectional shape (for example, circular) of the tubular 114 to form a close fit with the tubular 114 as the dissolvable gauge cutter 210 travels through the tubular 114 down to the specified depth within the wellbore. The selection of metals to be included in the dissolvable metal alloy making up the dissolvable gauge cutter 210 (along with the concentrations of the selected metals in the dissolvable alloy) can be adjusted and tailored to be compatible and suitable for specific well conditions that can be expected in the particular well in which the apparatus 200A is to be deployed for drifting and surveillance operations. For example, the composition of the dissolvable metal alloy making up the dissolvable gauge cutter 210 can be designed to exhibit a predictable dissolution rate based on the rate at which the apparatus 200A travels downhole through the tubular 114, expected downhole conditions (such as pressure and temperature), and expected composition of downhole fluids residing in the well 100, such that the dissolvable gauge cutter 210 can reach a specified depth within the well 100 before completely dissolving. The dissolvable gauge cutter 210 can be configured to completely dissolve after reaching the specified depth.

The temperature sensor 220 is configured to travel with the dissolvable gauge cutter 210, for example, through the tubular 114. In some implementations, the temperature sensor 220 is coupled to the dissolvable gauge cutter 210. The temperature sensor 220 is configured to measure a temperature of a surrounding fluid 120 as the temperature sensor 220 travels downhole with the dissolvable gauge cutter 210 through the tubular 114 to the specified depth. The temperature sensor 220 can include any suitable instrument typically used in downhole conditions to measure temperature. For example, the temperature sensor 220 can include a thermocouple, a resistance temperature detector (RTD), a fiber optic temperature sensor, or any combinations of these. The temperature sensor 220 can be configured to measure the temperature of the surrounding fluid 120 periodically as the temperature sensor 220 travels downhole with the dissolvable gauge cutter 210 through the tubular 114 to the specified depth. For example, the temperature sensor 220 can be configured to measure the temperature of the surrounding fluid 120 periodically at a uniform rate (for example, about every 5 seconds, about every 10 seconds, about every 20 seconds, about every 30 seconds, about every 40 seconds, about every 50 seconds, about every 60 seconds, about every 70 seconds, about every 80 seconds, about every 90 seconds, about every 100 seconds, about every 110 seconds, or about every 120 seconds). As another example, the temperature sensor 220 can be configured to measure the temperature of the surrounding fluid 120 periodically at a varied rate. In some implementations, the temperature sensor 220 is made of a material that is dissolvable. For example, the temperature sensor 220 can be made of the same or similar alloy as the dissolvable gauge cutter 210. In some implementations, the temperature sensor 220 is made of an alloy that includes magnesium and at least one of zinc, aluminum, iron, tungsten, nickel, manganese, or copper. In some implementations, the temperature sensor 220 is made of an alloy that includes the same components as the alloy making up the dissolvable gauge cutter 210 but with different concentration(s) of the components. In some cases, the temperature sensor 220 can be configured to dissolve at a slower rate in comparison to the dissolvable gauge cutter 210.

The pressure sensor 230 is configured to travel with the dissolvable gauge cutter 210, for example, through the tubular 114. In some implementations, the pressure sensor 230 is coupled to the dissolvable gauge cutter 210. The pressure sensor 230 is configured to measure a pressure of the surrounding fluid 120 as the pressure sensor 230 travels downhole with the dissolvable gauge cutter 210 through the tubular 114 to the specified depth. The pressure sensor 230 can include any suitable instrument typically used in downhole conditions to measure pressure. For example, the pressure sensor 230 can include a pressure transmitter, a pressure transducer, a fiber optic pressure sensor, or any combinations of these. The pressure sensor 230 can be configured to measure the pressure of the surrounding fluid 120 periodically as the pressure sensor 230 travels downhole with the dissolvable gauge cutter 210 through the tubular 114 to the specified depth. For example, the pressure sensor 230 can be configured to measure the pressure of the surrounding fluid 120 periodically at a uniform rate (for example, about every 5 seconds, about every 10 seconds, about every 20 seconds, about every 30 seconds, about every 40 seconds, about every 50 seconds, about every 60 seconds, about every 70 seconds, about every 80 seconds, about every 90 seconds, about every 100 seconds, about every 110 seconds, or about every 120 seconds). As another example, the pressure sensor 230 can be configured to measure the pressure of the surrounding fluid 120 periodically at a varied rate. In some implementations, the pressure sensor 230 is made of a material that is dissolvable. For example, the pressure sensor 230 can be made of the same or similar alloy as the dissolvable gauge cutter 210. In some implementations, the pressure sensor 230 is made of an alloy that includes magnesium and at least one of zinc, aluminum, iron, tungsten, nickel, manganese, or copper. In some implementations, the pressure sensor 230 is made of an alloy that includes the same components as the alloy making up the dissolvable gauge cutter 210 but with different concentration(s) of the components. In some cases, the pressure sensor 230 can be configured to dissolve at a slower rate in comparison to the dissolvable gauge cutter 210.

The distance sensor 240 is configured to travel with the dissolvable gauge cutter 210, for example, through the tubular 114. In some implementations, the distance sensor 240 is coupled to the dissolvable gauge cutter 210. The distance sensor 240 is configured to measure a distance between the distance sensor 240 and a surface location (for example, the surface 106) as the distance sensor 240 travels downhole with the dissolvable gauge cutter 210 through the tubular 114 to the specified depth. The distance sensor 240 can include any suitable instrument typically used in downhole conditions to measure distance. For example, the distance sensor 240 can include a gyroscopic sensor, a laser-based depth measuring sensor, an acoustic distance meter, a magnetic distance meter, or any combinations of these. The distance sensor 240 can be configured to measure the distance from the surface 106 periodically as the distance sensor 240 travels downhole with the dissolvable gauge cutter 210 through the tubular 114 to the specified depth. For example, the distance sensor 240 can be configured to measure the distance from the surface 106 periodically at a uniform rate (for example, about every 5 seconds, about every 10 seconds, about every 20 seconds, about every 30 seconds, about every 40 seconds, about every 50 seconds, about every 60 seconds, about every 70 seconds, about every 80 seconds, about every 90 seconds, about every 100 seconds, about every 110 seconds, or about every 120 seconds). As another example, the distance sensor 240 can be configured to measure the distance from the surface 106 periodically at a varied rate. In some implementations, the temperature sensor 220, the pressure sensor 230, and the distance sensor 240 measure temperature of the surrounding fluid 120, pressure of the surrounding fluid 120, and the distance from the surface 106, respectively, periodically at the same intervals. In some implementations, the temperature sensor 220, the pressure sensor 230, and the distance sensor 240 measure temperature of the surrounding fluid 120, pressure of the surrounding fluid 120, and the distance from the surface 106, respectively, periodically at different intervals. In some implementations, the distance sensor 240 is made of a material that is dissolvable. For example, the distance sensor 240 can be made of the same or similar alloy as the dissolvable gauge cutter 210. In some implementations, the distance sensor 240 is made of an alloy that includes magnesium and at least one of zinc, aluminum, iron, tungsten, nickel, manganese, or copper. In some implementations, the distance sensor 240 is made of an alloy that includes the same components as the alloy making up the dissolvable gauge cutter 210 but with different concentration(s) of the components. In some cases, the distance sensor 240 can be configured to dissolve at a slower rate in comparison to the dissolvable gauge cutter 210.

Figure 5:
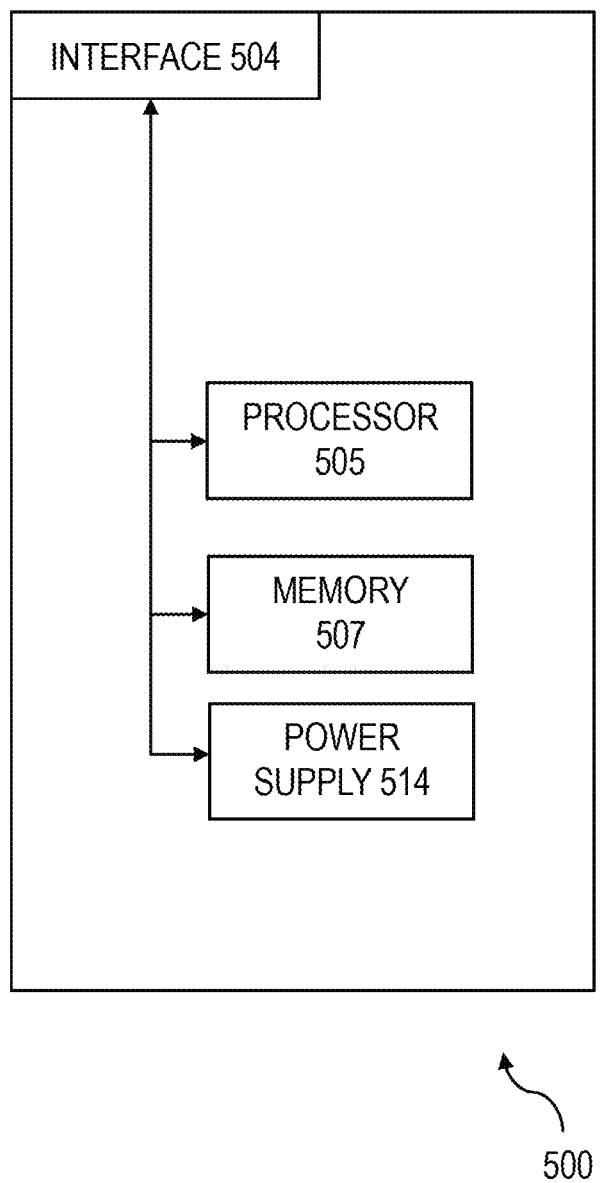
FIG. 5 is a block diagram of an example controller that can be implemented in any of the apparatuses of FIG. 2A or FIG. 2B.

The controller 500 is configured to travel with the dissolvable gauge cutter 210, for example, through the tubular 114. The controller 500 is communicatively coupled to the temperature sensor 220 and the pressure sensor 230. For example, the controller 500 can be wirelessly connected to the temperature sensor 220 and the pressure sensor 230. The temperature sensor 220 can be configured to transmit the measured temperature to the controller 500. The pressure sensor 230 can be configured to transmit the measured pressure to the controller 500. The controller 500 is configured to receive the measured temperature from the temperature sensor 220. The controller 500 is configured to receive the measured pressure from the pressure sensor 230. The controller 500 is configured to store the measured temperature received from the temperature sensor 220 and the measured pressure received from the pressure sensor 230 in a memory of the controller 500. An example of the controller 500 is also shown in FIG. 5 and described in more detail later.

In implementations in which the apparatus 200A includes the distance sensor 240, the controller 500 is communicatively coupled to the distance sensor 240. For example, the controller 500 can be wirelessly connected to the distance sensor 240. The distance sensor 240 can be configured to transmit the measured distance to the controller 500. The controller 500 can be configured to receive the measured distance from the distance sensor 240. The controller 500 can be configured to store the measured distance received from the distance sensor 240 in the memory of the controller 500. In some implementations, the controller 500 is configured to release from the dissolvable gauge cutter 210 in response to dissolution of the dissolvable gauge cutter 210. In some implementations, the controller 500 has a density that is lighter than the surrounding fluid 120, such that the controller 500 is configured to float back to the surface 106 after the dissolvable gauge cutter 210 has dissolved. Once the controller 500 has floated back to the surface 106, the stored data (for example, the measured temperature, the measured pressure, the measured distance, or any combination of these) can be retrieved from the controller 500.

In some implementations, the controller 500 is made of a material that is dissolvable. For example, the controller 500 can be made of the same or similar alloy as the dissolvable gauge cutter 210. In some implementations, the controller 500 is made of an alloy that includes magnesium and at least one of zinc, aluminum, iron, tungsten, nickel, manganese, or copper. In some implementations, the controller 500 is made of an alloy that includes the same components as the alloy making up the dissolvable gauge cutter 210 but with different concentration(s) of the components. In some cases, the controller 500 can be configured to dissolve at a slower rate in comparison to the dissolvable gauge cutter 210. In some implementations, the temperature sensor 220, the pressure sensor 230, the distance sensor, 240, and the controller 500 are made of the same or similar dissolvable material. For example, the temperature sensor 220, the pressure sensor 230, the distance sensor, 240, and the controller 500 can be made of the same dissolvable alloy. In implementations in which the controller 500 is made of a dissolvable alloy, the controller 500 is configured to wirelessly transmit the measured temperature, the measured pressure, the measured distance, or any combination of these to an equipment (such as another controller) located at the surface 106 above and exterior to the wellbore.

Figure 2B:
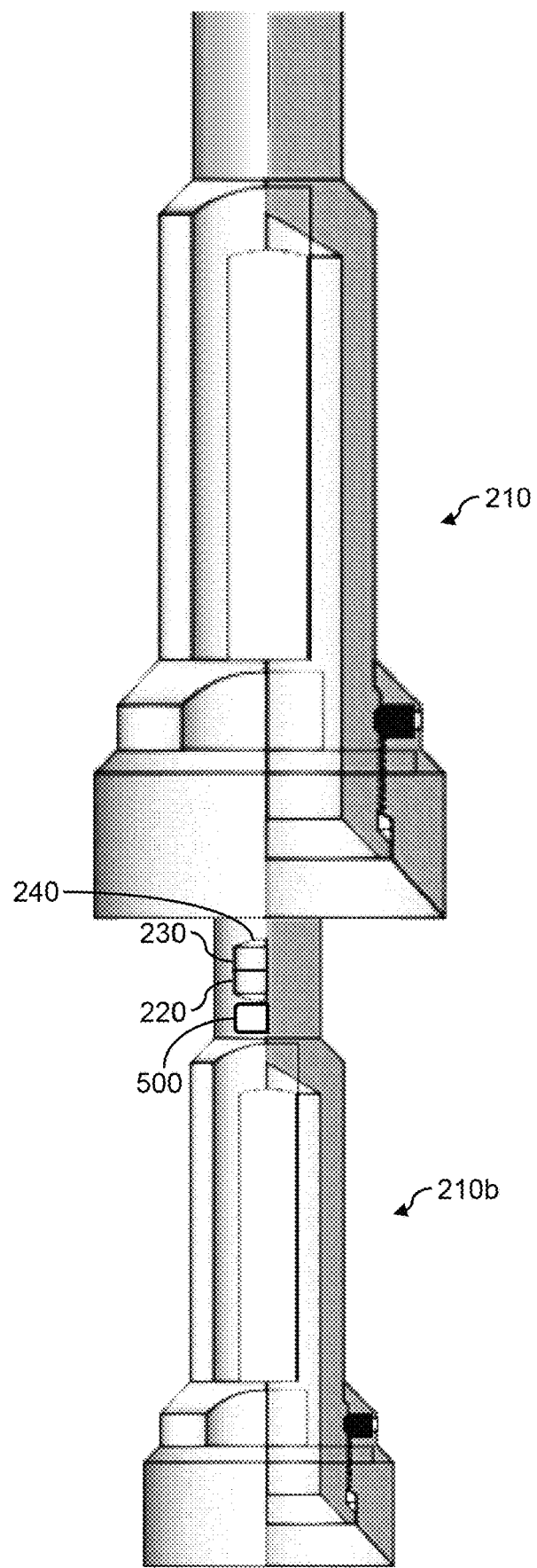
FIG. 2B is a schematic diagram of an example apparatus that can implement drifting and surveillance operations in the well of FIG. 1.

FIG. 2B is a schematic diagram of an example apparatus 200B that can implement drifting and surveillance operations in the well 100. The apparatus 200B can be substantially similar to the apparatus 200A shown in FIG. 2A. For example, the apparatus 200B includes the dissolvable gauge cutter 210, the temperature sensor 220, the pressure sensor 230, and the distance sensor 240. In some implementations, as shown in FIG. 2B, the apparatus 200B includes a second dissolvable gauge cutter 210b. The second dissolvable gauge cutter 210b is reversibly coupled to the first dissolvable gauge cutter 210. In some implementations, as shown in FIG. 2B, the apparatus 200B includes the controller 500.

The second dissolvable gauge cutter 210b can be substantially similar to the first dissolvable gauge cutter 210. For example, the second dissolvable gauge cutter 210b can be made of a material that has a similar composition of the material that makes up the first dissolvable gauge cutter 210. For example, the second dissolvable gauge cutter 210b can be made of an alloy that includes magnesium and at least one of zinc, aluminum, iron, tungsten, nickel, manganese, or copper. In some implementations, the second dissolvable gauge cutter 210b is made of an alloy that includes the same components of the alloy that makes up the first dissolvable gauge cutter 210, but in different concentrations. The second dissolvable gauge cutter 210b can be configured to dissolve at a slower rate in comparison to the first dissolvable gauge cutter 210. For example, the second dissolvable gauge cutter 210b can be made of an alloy that has a larger nickel and/or a larger iron concentration in comparison to the alloy making up the first dissolvable gauge cutter 210, so that the second dissolvable gauge cutter 210b dissolves more slowly in response to exposure to downhole fluids in comparison to the first dissolvable gauge cutter 210. As another example, the second dissolvable gauge cutter 210b can have a similar shape as the first dissolvable gauge cutter 210, but smaller in size. In some implementations, the second dissolvable gauge cutter 210b has a similar shape as the first dissolvable gauge cutter 210, but a smaller outer diameter.

The first dissolvable gauge cutter 210 is configured to dissolve at a faster rate in comparison to the second dissolvable gauge cutter 210b upon exposure to the surrounding fluid 120. Once the apparatus 200B has reached the first specified depth, the second dissolvable gauge cutter 210b can detach from the first dissolvable gauge cutter 210 and sink further downhole into the well 100. The second dissolvable gauge cutter 210b is configured to dissolve at a slower rate in comparison to the first dissolvable gauge cutter 210. As such, the second dissolvable gauge cutter 210b can remain intact (that is, undissolved) until the apparatus 200B has at least reached the first specified depth. The specific compositions of the alloys making up the first dissolvable gauge cutter 210 and the second dissolvable gauge cutter 210b can be selected to achieve the desired dissolution rates of the respective gauge cutters for implementing reliable and effective drifting and surveillance operations in the well 100. The specific compositions of the alloys making up the first dissolvable gauge cutter 210 and the second dissolvable gauge cutter 210b (and respective shapes and/or sizes) can be designed and optimized according to various characteristics of the well 100, such as the composition of downhole fluids (e.g., surrounding fluid 120), operating conditions expected downhole in the well 100, desired depth(s) to be reached in the well 100, or any combinations of these.

In some implementations, the first dissolvable gauge cutter 210 is made of a first alloy that includes calcium, aluminum, zinc, and tin, and the second dissolvable gauge cutter 210b is made of a second alloy that includes magnesium, zinc, manganese, and nickel. Inclusion of calcium in the first dissolvable gauge cutter 210 can promote quicker dissolution, as calcium is more reactive in comparison to aluminum and can accelerate the dissolution process. Inclusion of magnesium as the primary component in the second dissolvable gauge cutter 210b and addition of zinc, manganese, and nickel can help to improve mechanical properties and provide corrosion resistance. In some implementations, the first alloy has a calcium content (by weight) in a range of from about 30% to about 70%, from about 40% to about 60%, or from about 45% to about 55%. In some implementations, the first alloy has an aluminum content (by weight) in a range of from about 20% to about 60%, from about 30% to about 50%, or from about 35% to about 45%. In some implementations, the first alloy has a zinc content (by weight) in a range of from about 0.1% to about 10%, from about 1% to about 8%, from about 3% to about 7%, or from about 4% to about 6%. In some implementations, the first alloy has a tin content (by weight) in a range of from about 0.1% to about 10%, from about 1% to about 8%, from about 3% to about 7%, or from about 4% to about 6%. In some implementations, the second alloy has a magnesium content (by weight) in a range of from about 60% to about 95%, from about 70% to about 90%, or from about 75% to about 85%. In some implementations, the second alloy has a zinc content (by weight) in a range of from about 1% to about 20%, from about 5% to about 15%, or from about 8% to about 12%. In some implementations, the second alloy has a manganese content (by weight) in a range of from about 0.1% to about 10%, from about 1% to about 8%, from about 3% to about 7%, or from about 4% to about 6%. In some implementations, the second alloy has a nickel content (by weight) in a range of from about 0.1% to about 10%, from about 1% to about 8%, from about 3% to about 7%, or from about 4% to about 6%.

The apparatus 200B is configured to perform drifting operations down to multiple depths within the well 100. For example, the apparatus 200B travels downhole through the tubular 114, and the first dissolvable gauge cutter 210 scrapes against the inner wall of the tubular 114 to dislodge solids from the inner wall of the tubular 114 and ensure a first minimum inner diameter of the tubular 114 down to a first specified depth. Once the apparatus 200B has reached the first specified depth within the well 100, the second dissolvable gauge cutter 210b can de-couple from the first dissolvable gauge cutter 210 and descend further downhole into the well 100. After reaching the first specified depth within the well 100, the first dissolvable gauge cutter 210 completely dissolves. In some cases, a second tubular 114b is installed in the well 100. The second tubular 114b can have a smaller inner diameter in comparison to the first tubular 114. After de-coupling from the first dissolvable gauge cutter 210, the second dissolvable gauge cutter 210b can continue further downhole through the second tubular 114b. As the second dissolvable gauge cutter 210b travels downhole through the second tubular 114b, the second dissolvable gauge cutter 210b scrapes against an inner wall of the second tubular 114b to dislodge solids from the inner wall of the second tubular 114b and ensure a second minimum inner diameter of the second tubular 114 down to a second specified depth. After reaching the second specified depth within the well 100, the second dissolvable gauge cutter 210 completely dissolves.

As shown in FIG. 2B, the sensors (220, 230, 240) can be configured to travel with the second dissolvable gauge cutter 210, such that the sensors (220, 230, 240) can obtain measurements of various properties and/or conditions (such as pressure, temperature, distance) all the way down to the second specified depth within the well 100. In implementations in which the sensors (220, 230, 240) are dissolvable in the downhole fluids, the sensors are made of a material that is configured to dissolve more slowly in comparison to the second dissolvable gauge cutter 210b upon exposure to downhole fluids, so that the sensors (220, 230, 240) can obtain measurements of various properties and/or conditions (such as pressure, temperature, distance) all the way down to the second specified depth within the well 100. The controller 500 can be configured to travel with the second dissolvable gauge cutter 210, such that the controller 500 can receive the measured data from the sensors (220, 230, 240) all the way down to the second specified depth within the well 100.

In implementations in which the controller 500 is dissolvable in the downhole fluids, the controller 500 is made of a material that is configured to dissolve more slowly in comparison to the second dissolvable gauge cutters and/or the sensors (220, 230, 240), so that the controller 500 can receive the measured data from the sensors (220, 230, 240) all the way down to the second specified depth within the well 100. In such implementations, the controller 500 can transmit the measured data from the sensors (220, 230, 240) to an equipment (such as another controller) located at the surface 106 exterior of the well 100. In implementations in which the controller 500 is not dissolvable in the downhole fluids, the controller 500 has a density that is lighter than the surrounding fluid 120, such that the controller 500 is configured to float back to the surface 106 after the second dissolvable gauge cutter 210b has dissolved. For example, the controller 500 can detach from the second dissolvable gauge cutter 210b in response to dissolution of the second dissolvable gauge cutter 210b upon reaching the second specified depth within the well 100. Then, the controller 500 can float back to the surface 106 where the stored data can be retrieved from the controller 500.

Figure 3A:
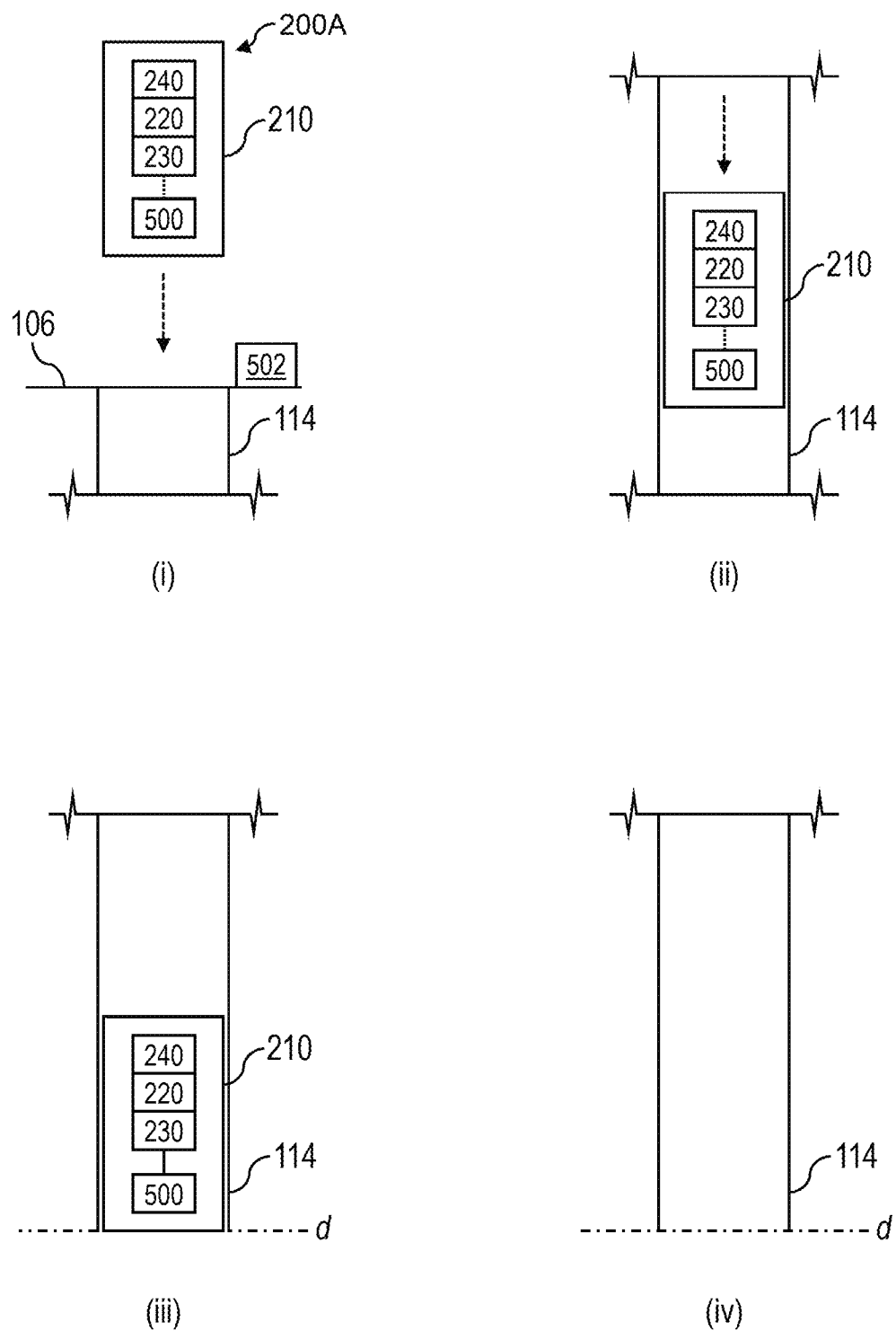
FIG. 3A is an example progression of the apparatus of FIG. 2A performing drifting and surveillance operations in the well of FIG. 1.

FIG. 3A is an example progression 300A of the apparatus 200A performing drifting and surveillance operations in the well 100. At step (i), the apparatus 200A is lowered into the tubular 114 at the surface 106. A secondary controller 502 is located at the surface 106. The controller 502 can be substantially similar to the controller 500 of the apparatus 200A. For example, the secondary controller 502 is another implementation of the controller 500. At step (ii), the apparatus 200A travels downhole through the tubular 114. The dissolvable gauge cutter 210 scrapes against an inner wall of the tubular 114 as the apparatus 200A travels downhole through the tubular 114. By scraping against the inner wall of the tubular 114, the dissolvable gauge cutter 210 removes solids (such as debris or paraffin wax) that has deposited and/or accumulated on the inner wall of the tubular 114 to ensure a minimum inner diameter of the tubular 114. Thus, the dissolvable gauge cutter 210 performs a drifting operation on the tubular 114 as the apparatus 200A travels downhole through the tubular 114. As the apparatus 200A travels downhole through the tubular 114, the sensors (220, 230, 240) of the apparatus 200A obtain measurements (such as temperature, pressure, distance, or any combination of these). As the apparatus 200A travels downhole through the tubular 114, the controller 500 of the apparatus 200A can transmit the data that has been obtained by the sensors (220, 230, 240) wirelessly to the secondary controller 502 located at the surface 106. At step (iii), the apparatus 200A has reached a specified depth (d) within the wellbore in which the tubular 114 is installed, and the drifting operation has completed. In some cases, the specified depth (d) is the depth at which the tubular 114 terminates. At step (iv), the apparatus 200A has completely dissolved, such that a retrieval operation is not necessary.

Figure 3B:
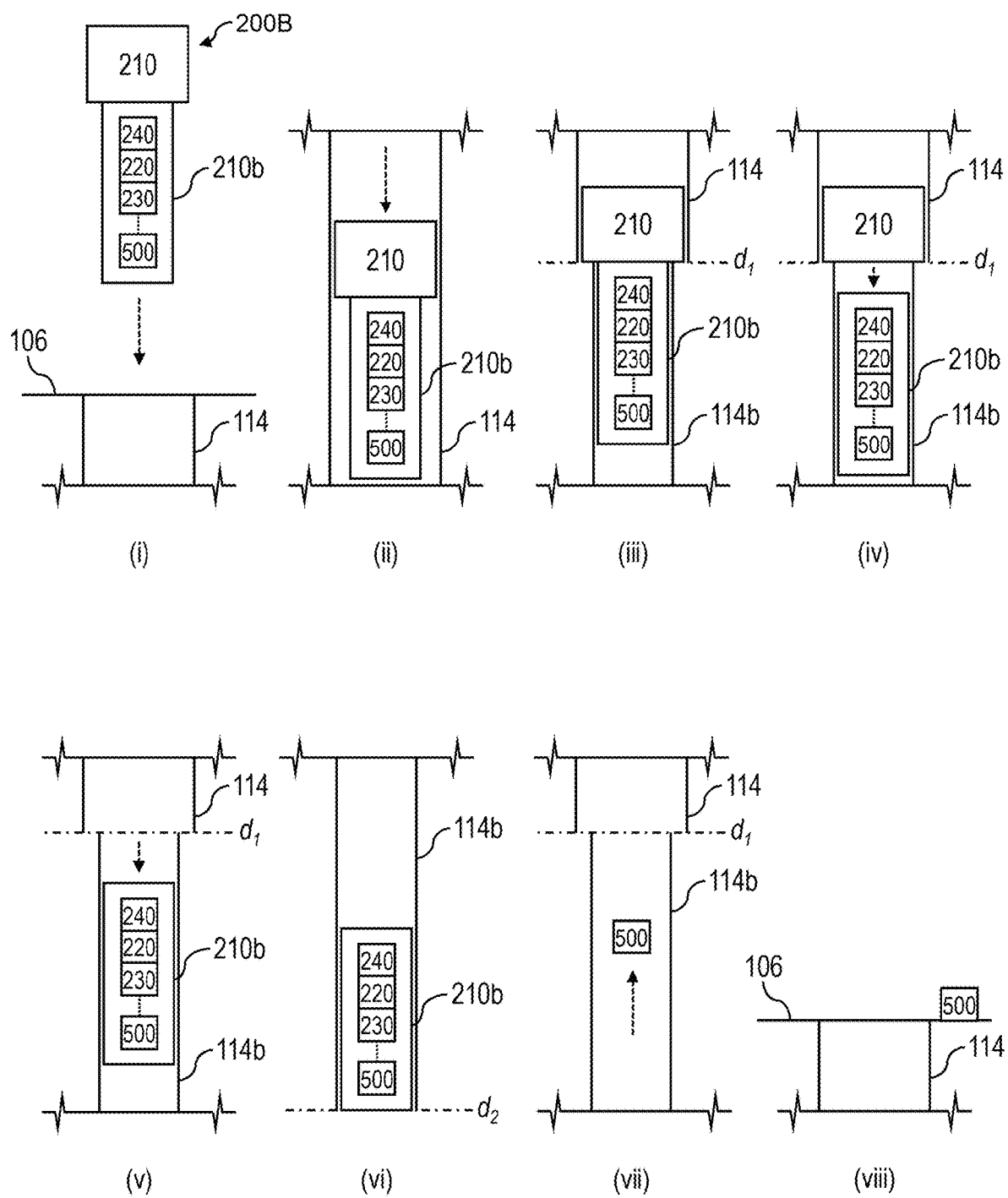
FIG. 3B is an example progression of the apparatus of FIG. 2B performing drifting and surveillance operations in the well of FIG. 1.

FIG. 3B is an example progression 300B of the apparatus 200B performing drifting and surveillance operations in the well 100. At step (i), the apparatus 200B is lowered into the tubular 114 at the surface 106. At step (ii), the apparatus 200A travels downhole through the tubular 114. The dissolvable gauge cutter 210 scrapes against an inner wall of the tubular 114 as the apparatus 200B travels downhole through the tubular 114. By scraping against the inner wall of the tubular 114, the dissolvable gauge cutter 210 removes solids (such as debris or paraffin wax) that has deposited and/or accumulated on the inner wall of the tubular 114 to ensure a minimum inner diameter of the tubular 114. Thus, the dissolvable gauge cutter 210 performs a drifting operation on the tubular 114 as the apparatus 200B travels downhole through the tubular 114. As the apparatus 200B travels downhole through the tubular 114, the sensors (220, 230, 240) of the apparatus 200B obtain measurements (such as temperature, pressure, distance, or any combination of these). As the apparatus 200B travels downhole through the tubular 114, the controller 500 of the apparatus 200B can store the data that has been obtained by the sensors (220, 230, 240), for example, in a memory of the controller 500. At step (iii), the dissolvable gauge cutter 210 of the apparatus 200B has reached a first specified depth ($d_1$) within the wellbore in which the tubular 114 is installed, and the drifting operation for the tubular 114 has completed. In some cases, the first specified depth ($d_1$) is the depth at which the tubular 114 terminates. At step (iv), the second dissolvable gauge cutter 210b detaches from the dissolvable gauge cutter 210b and travels further downhole through the second tubular 114b. At step (v), the second dissolvable gauge cutter 210b continues to travel further downhole through the second tubular 114b, and the dissolvable gauge cutter 210 has completely dissolved, such that a retrieval operation for the dissolvable gauge cutter 210 is not necessary. The second dissolvable gauge cutter 210b scrapes against an inner wall of the second tubular 114b as the remaining portion of the apparatus 200B travels downhole through the second tubular 114b. By scraping against the inner wall of the second tubular 114b, the second dissolvable gauge cutter 210b removes solids (such as debris or paraffin wax) that has deposited and/or accumulated on the inner wall of the second tubular 114b to ensure a second minimum inner diameter of the second tubular 114b. Thus, the second dissolvable gauge cutter 210b performs a drifting operation on the second tubular 114b as the remaining portion of the apparatus 200B travels downhole through the second tubular 114b. As the remaining portion of the apparatus 200B travels downhole through the second tubular 114b, the sensors (220, 230, 240) of the remaining portion of the apparatus 200B obtain measurements (such as temperature, pressure, distance, or any combination of these). As the remaining portion of the apparatus 200B travels downhole through the second tubular 114, the controller 500 can store the data that has been obtained by the sensors (220, 230, 240), for example, in the memory of the controller 500. At step (vi), the second dissolvable gauge cutter 210b of the apparatus 200B has reached a second specified depth ($d_2$) within the wellbore in which the second tubular 114b is installed, and the drifting operation for the second tubular 114b has completed. In some cases, the second specified depth ($d_2$) is the depth at which the second tubular 114b terminates. The second dissolvable gauge cutter 210b can completely dissolve, such that a retrieval operation for the second dissolvable gauge cutter 210b is not necessary. Any of the sensors (220, 230, 240) can completely dissolve, such that a retrieval operation for the respective sensors is not necessary. At step (vii), the controller 500 has been released from the remaining portion of the apparatus 200B. For example, dissolution of the second dissolvable gauge cutter 210b releases the controller 500. Due to its lighter density, the controller 500 floats uphole back toward the surface 106. At step (viii), the controller 500 has floated back to the surface 106. The data that has been stored in the memory of the controller 500 can be retrieved from the controller 500.

Figure 4:
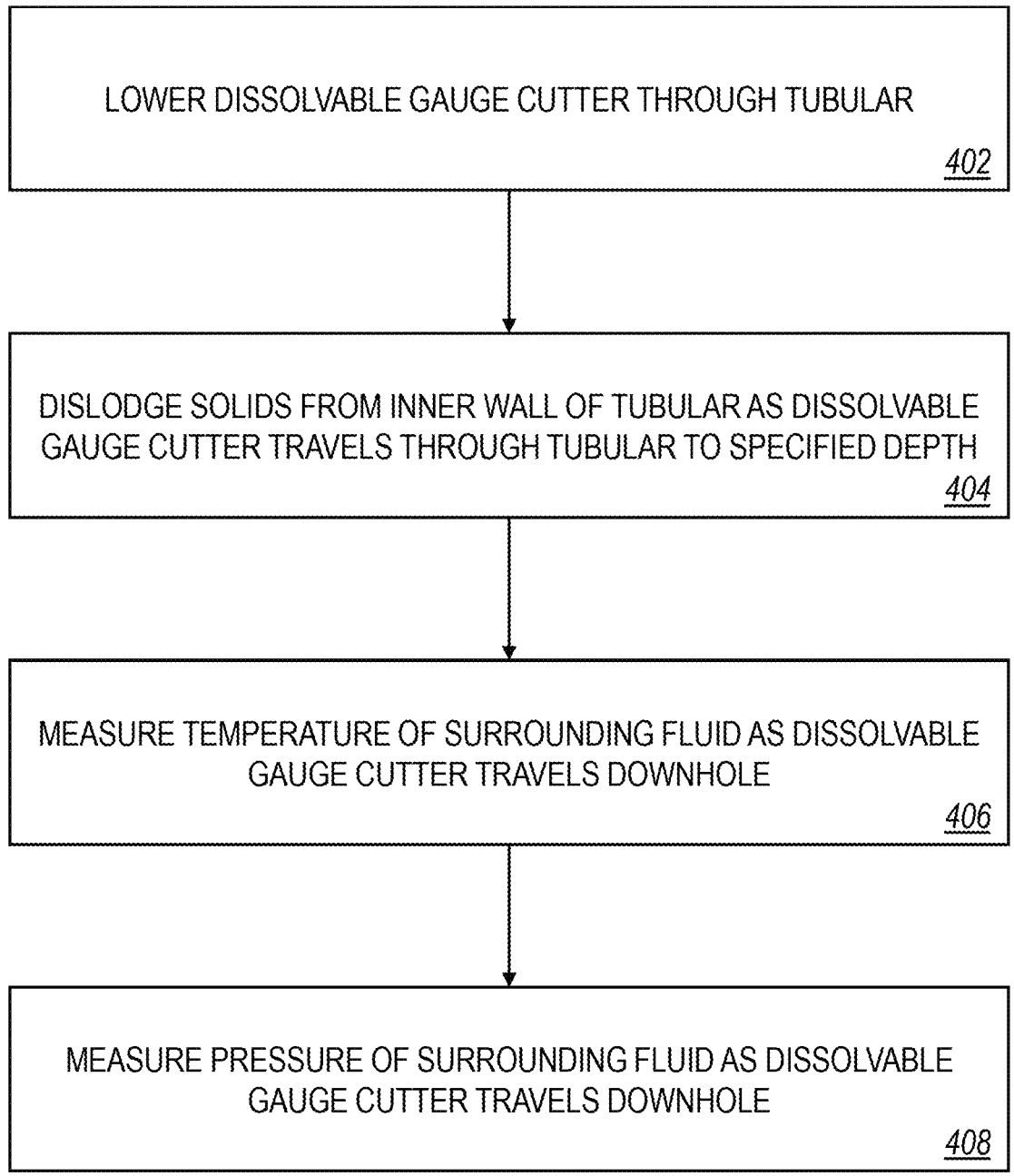
FIG. 4 is a flow chart of an example method for performing drifting and surveillance operations in the well of FIG. 1.

FIG. 4 is a flow chart of an example method 400 for performing drifting and surveillance operations in the well 100. The method 400 can, for example, be implemented by any of the apparatuses 200A or 200B. At block 402, a dissolvable gauge cutter (such as the dissolvable gauge cutter 210) is lowered through a tubular (such as the tubular 114) that is installed within a wellbore (such as the wellbore of the well 100) formed in a subterranean formation. At block 404, the dissolvable gauge cutter 210 dislodges solids from an inner wall of the tubular 114 as the dissolvable gauge cutter 210 travels through the tubular 114 to a specified depth within the wellbore to ensure a minimum inner diameter of the tubular 114. Block 404 can be considered a drifting operation. At block 406, a temperature sensor (such as the temperature sensor 220) measures a temperature of a surrounding fluid (such as the surrounding fluid 120) as the dissolvable gauge cutter 210 travels downhole through the tubular 114 to the specified depth. At block 408, a pressure sensor (such as the pressure sensor 230) measures a pressure of the surrounding fluid 120 as the dissolvable gauge cutter 210 travels downhole through the tubular 114 to the specified depth. Blocks 406 and 408 can be considered surveillance and/or logging operations. Blocks 406 and 408 can be repeated periodically as the dissolvable gauge cutter 210 travels downhole through the tubular 114 to the specified depth, such that multiple temperature and pressure measurements can be obtained across the length of the tubular 114.

In some implementations, the method 400 includes measuring, by a distance sensor (such as the distance sensor 240), a distance between the distance sensor 240 and a surface location (such as the surface 106) as the dissolvable gauge cutter 210 travels downhole through the tubular 114 to the specified depth. The distance between the distance sensor 240 and the surface 106 can be measured periodically as the dissolvable gauge cutter 210 travels downhole through the tubular 114 to the specified depth. In some implementations, the distance sensor 240 measures the distance between the distance sensor 240 and the surface 106 each time block 406 and block 408 are implemented, such that the measured temperature (block 406) and the measured pressure (block 408) can be attributed a corresponding distance (depth within the well 100).

In some implementations, the method 400 includes receiving, by a controller (such as the controller 500), the measured temperature (block 406) from the temperature sensor 220. The controller 500 can store the measured temperature received from the temperature sensor 220 in the memory of the controller 500. In some implementations, the method 400 includes receiving, by the controller 500, the measured pressure (block 408) from the pressure sensor 230. The controller 500 can store the measured pressure received from the pressure sensor 230 in the memory of the controller 500. In some implementations, the method 400 includes receiving, by the controller 500, the measured distance from the distance sensor 240. The controller 500 can store the measured distance received from the distance sensor 240 in the memory of the controller 500.

In some implementations, the method 400 includes receiving the measured temperature (block 406) at the surface 106. Receiving the measured temperature (block 406) at the surface 106 can include wirelessly transmitting, by the controller 500 (while it is still located downhole in the well 100), the measured temperature to the surface 106. The measured temperature that has been transmitted by the controller 500 can be received, for example, by another controller located at the surface 106 exterior to the well 100. In some implementations, the method 400 includes receiving the measured pressure (block 408) at the surface 106. Receiving the measured pressure (block 408) at the surface 106 can include wirelessly transmitting, by the controller 500 (while it is still located downhole in the well 100), the measured pressure to the surface 106. The measured pressure that has been transmitted by the controller 500 can be received, for example, by another controller located at the surface 106 exterior to the well 100. In some implementations, the method 400 includes receiving the measured distance at the surface 106. Receiving the measured distance at the surface 106 can include wirelessly transmitting, by the controller 500 (while it is still located downhole in the well 100), the measured distance to the surface 106. The measured distance that has been transmitted by the controller 500 can be received, for example, by another controller located at the surface 106 exterior to the well 100.

In some implementations, the controller 500 has a density that is lighter than the surrounding fluid 120. In such implementations, once the dissolvable gauge cutter 210 has reached the specified depth, the controller 500 can detach from the dissolvable gauge cutter 210 (for example, in response to dissolution of the dissolvable gauge cutter 210) and float back to the surface 106. The measured data (for example, temperature, pressure, distance, or any combinations of these) can then be retrieved from the controller 500 that has floated back to the surface 106.

FIG. 5 is a block diagram of an example controller 500 used to provide computational functionalities associated with described algorithms, methods, functions, processes, flows, and procedures, as described in this specification, according to an implementation. The illustrated controller 500 is intended to encompass any computing device such as a server, desktop computer, laptop/notebook computer, one or more processors within these devices, or any other processing device, including physical or virtual instances (or both) of the computing device. Additionally, the controller 500 can include a computer that includes an input device, such as a keypad, keyboard, touch screen, or other device that can accept user information, and an output device that conveys information associated with the operation of the controller 500, including digital data, visual, audio information, or a combination of information.

The controller 500 includes an interface 504. Although illustrated as a single interface 504 in FIG. 5, two or more interfaces 504 may be used according to particular needs, desires, or particular implementations of the controller 500. Although not shown in FIG. 5, the controller 500 can be communicably coupled with a network. The interface 504 is used by the controller 500 for communicating with other systems that are connected to the network in a distributed environment. Generally, the interface 504 comprises logic encoded in software or hardware (or a combination of software and hardware) and is operable to communicate with the network. More specifically, the interface 504 may comprise software supporting one or more communication protocols associated with communications such that the network or interface's hardware is operable to communicate physical signals within and outside of the illustrated controller 500. The interface 504 can include a control interface, which can be used to couple the controller 500 to controls. In some implementations, the control interface is a bank of relays, a bank of MOSFET power controllers, a serial peripheral interface (SPI), or a Fieldbus, and the like. The interface 504 can include a sensor interface, which can be used to couple the controller 500 to sensors. In some implementations, the sensor interface is a bank of analog-to-digital converters (ADCs), and I2C bus, a serial peripheral interface (SPI) bus, or a Fieldbus, and the like. The interface 504 can include a human machine interface, which can be used by a user to interact with the controller 500. In some implementations, the human machine interface includes a monitor or a touch screen that is configured to display information, for example, to a user.

The controller 500 includes a processor 505. The processor 505 may be a microprocessor, a multi-core processor, a multithreaded processor, an ultra-low-voltage processor, an embedded processor, or a virtual processor. In some embodiments, the processor 505 may be part of a system-on-a-chip (SoC) in which the processor 505 and the other components of the controller 500 are formed into a single integrated electronics package. In some implementations, the processor 505 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used. Although illustrated as a single processor 505 in FIG. 5, two or more processors may be used according to particular needs, desires, or particular implementations of the controller 500. Generally, the processor 505 executes instructions and manipulates data to perform the operations of the controller

500 and any algorithms, methods, functions, processes, flows, and procedures as described in this specification. The processor 505 may communicate with other components of the controller 500 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in an SoC based system. Other bus technologies may be used, in addition to, or instead of, the technologies above.

The controller 500 also includes a memory 507 that can hold data for the controller 500 or other components (or a combination of both) that can be connected to the network. Although illustrated as a single memory 507 in FIG. 5, two or more memories 507 (of the same or combination of types) can be used according to particular needs, desires, or particular implementations of the controller 500 and the described functionality. While memory 507 is illustrated as an integral component of the controller 500, memory 507 can be external to the controller 500. The memory 507 can be a transitory or non-transitory storage medium. In some implementations, such as in PLCs and other process control units, the memory 507 is integrated with the database 506 used for long-term storage of programs and data. The memory 507 can include any number of volatile and non-volatile memory devices, such as volatile random-access memory (RAM), static random-access memory (SRAM), flash memory, and the like. In smaller devices, such as PLCs, the memory 507 may include registers associated with the processor 505 itself.

The memory 507 stores computer-readable instructions executable by the processor 505 that, when executed, cause the processor 505 to perform operations, such as transmit the measured temperature, the measured pressure, the measured distance, or any combination of these to an equipment (such as another controller) located at the surface 106. The controller 500 can also include a power supply 514. The power supply 514 can include a rechargeable or non-rechargeable battery that can be configured to be either user- or non-user-replaceable. The power supply 514 can be hard-wired. There may be any number of computers 500 associated with, or external to, a computer system containing controller 500, each controller 500 communicating over the network. Further, the term "client," "user," "operator," and other appropriate terminology may be used interchangeably, as appropriate, without departing from this specification. Moreover, this specification contemplates that many users may use one controller 500, or that one user may use multiple computers 500.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An apparatus comprising:
   a dissolvable gauge cutter made of an alloy comprising magnesium and at least one of zinc, aluminum, iron, tungsten, nickel, manganese, or copper, the dissolvable gauge cutter configured to be disposed within and travel through a tubular installed within a wellbore formed in a subterranean formation, the dissolvable gauge cutter configured to dislodge solids from an inner wall of the tubular as the dissolvable gauge cutter travels through the tubular down to a specified depth within the wellbore, the dissolvable gauge cutter configured to completely dissolve after reaching the specified depth;

a temperature sensor configured to travel with the dissolvable gauge cutter and measure a temperature of a surrounding fluid as the dissolvable gauge cutter travels downhole through the tubular to the specified depth, wherein the temperature sensor is dissolvable and made of the alloy; and a pressure sensor configured to travel with the dissolvable gauge cutter and measure a pressure of the surrounding fluid as the dissolvable gauge cutter travels downhole through the tubular to the specified depth, wherein the pressure sensor is dissolvable and made of the alloy.

2. The apparatus of claim 1, further comprising a distance sensor configured to travel with the dissolvable gauge cutter and measure a distance between the distance sensor and a surface location.

3. The apparatus of claim 2, wherein the distance sensor is dissolvable and made of the alloy.

4. The apparatus of claim 3, further comprising a controller configured to travel with the dissolvable gauge cutter, wherein the controller is wirelessly and communicatively coupled to the temperature sensor, the pressure sensor, and the distance sensor, wherein the controller is configured to receive the measured temperature from the temperature sensor, the measured pressure from the pressure sensor, and the measured distance from the distance sensor, and the controller is configured to wirelessly transmit the measured temperature, the measured pressure, and the measured distance to the surface location.

5. The apparatus of claim 2, further comprising a controller configured to travel with the dissolvable gauge cutter, wherein the controller is wirelessly and communicatively coupled to the temperature sensor, the pressure sensor, and the distance sensor, wherein the controller is configured to receive the measured temperature from the temperature sensor, the measured pressure from the pressure sensor, and the measured distance from the distance sensor, the controller is configured to store the measured temperature, the measured pressure, and the measured distance in a memory of the controller, and the controller is configured to release from the dissolvable gauge cutter in response to dissolution of the dissolvable gauge cutter.

6. The apparatus of claim 5, wherein the controller has a density that is lighter than the surrounding fluid, such that the controller is configured to float back to the surface location after the dissolvable gauge cutter has dissolved.

7. The apparatus of claim 2, wherein:
the apparatus further comprises a second dissolvable gauge cutter made of a second alloy comprising magnesium and at least one of zinc, aluminum, iron, tungsten, nickel, manganese, or copper;
the second dissolvable gauge cutter configured to reversibly couple to the dissolvable gauge cutter;
the second dissolvable gauge cutter configured to ensure a second minimum inner diameter down to a second specified depth within the wellbore; and
the second dissolvable gauge cutter configured to completely dissolve after reaching the second specified depth.

8. The apparatus of claim 7, wherein the second minimum inner diameter is less than the minimum inner diameter, the second specified depth is deeper than the specified depth, and the second dissolvable gauge cutter is configured to dissolve at a slower rate in comparison to the dissolvable gauge cutter.

9. An apparatus comprising:
a first dissolvable gauge cutter made of a first alloy comprising magnesium and at least one of zinc, aluminum, iron, tungsten, nickel, manganese, or copper, the first dissolvable gauge cutter configured to be disposed within and travel through a tubular installed within a wellbore formed in a subterranean formation, the dissolvable gauge cutter configured to dislodge solids from an inner wall of the tubular as the first dissolvable gauge cutter travels through the tubular down to a first specified depth within the wellbore to ensure a first minimum inner diameter down to the first specified depth, the first dissolvable gauge cutter configured to completely dissolve after reaching the first specified depth;

a second dissolvable gauge cutter reversibly coupled to the first dissolvable gauge cutter, the second dissolvable gauge cutter made of a second alloy comprising magnesium and at least one of zinc, aluminum, iron, tungsten, nickel, manganese, or copper, the second dissolvable gauge cutter configured to ensure a second minimum inner diameter down to a second specified depth within the wellbore, the second dissolvable gauge cutter configured to completely dissolve after reaching the second specified depth;

a temperature sensor configured to travel with the second dissolvable gauge cutter and measure a temperature of a surrounding fluid as the second dissolvable gauge cutter travels downhole to the second specified depth;

a pressure sensor configured to travel with the second dissolvable gauge cutter and measure a pressure of the surrounding fluid as the apparatus travels downhole to the second specified depth; and a distance sensor configured to travel with the second dissolvable gauge cutter and measure a distance between the distance sensor and a surface location.

10. The apparatus of claim 9, further comprising a controller configured to travel with the second dissolvable gauge cutter, wherein the controller is wirelessly and communicatively coupled to the temperature sensor, the pressure sensor, and the distance sensor, wherein the controller is configured to receive the measured temperature from the temperature sensor, the measured pressure from the pressure sensor, and the measured distance from the distance sensor, wherein the controller is configured to wirelessly transmit the measured temperature, the measured pressure, and the measured distance to the surface location.

11. The apparatus of claim 9, further comprising a controller configured to travel with the second dissolvable gauge cutter, wherein the controller is wirelessly and communicatively coupled to the temperature sensor, the pressure sensor, and the distance sensor, wherein the controller is configured to receive the measured temperature from the temperature sensor, the measured pressure from the pressure sensor, and the measured distance from the distance sensor, wherein the controller is configured to release from the second dissolvable gauge cutter in response to dissolution of the second dissolvable gauge cutter, wherein the controller has a density that is lighter than the surrounding fluid, such that the controller is configured to float back to the surface location after the first dissolvable gauge cutter and the second dissolvable gauge cutter have dissolved.

12. The apparatus of claim 9, wherein the second minimum inner diameter is less than the first minimum inner diameter, the second specified depth is deeper than the first specified depth, and the second dissolvable gauge cutter is configured to dissolve at a slower rate in comparison to the first dissolvable gauge cutter.

13. A method comprising:
lowering a dissolvable gauge cutter, a temperature sensor, and a pressure sensor through a tubular installed within a wellbore formed in a subterranean formation, the dissolvable gauge cutter, the temperature sensor, and the pressure sensor are dissolvable and made of an alloy comprising magnesium and at least one of zinc, aluminum, iron, tungsten, nickel, manganese, or copper;
dislodging, by the dissolvable gauge cutter, solids from an inner wall of the tubular as the dissolvable gauge cutter travels through the tubular to a specified depth within the wellbore to ensure a minimum inner diameter of the tubular;
measuring, by the temperature sensor, a temperature of a surrounding fluid as the dissolvable gauge cutter travels downhole through the tubular to the specified depth; and
measuring, by the pressure sensor, a pressure of the surrounding fluid as the dissolvable gauge cutter travels downhole through the tubular to the specified depth, wherein the dissolvable gauge cutter completely dissolves after reaching the specified depth.

14. The method of claim 13, further comprising measuring, by a distance sensor, a distance between the distance sensor and a surface location as the dissolvable gauge cutter travels downhole through the tubular to the specified depth.

15. The method of claim 14, further comprising:
receiving, by a controller, the measured temperature from the temperature sensor, the measured pressure from the pressure sensor, and the measured distance from the distance sensor; and
storing, by the controller, the measured temperature, the measured pressure, and the measured distance in a memory of the controller.

16. The method of claim 15, further comprising receiving the measured temperature, the measured pressure, and the measured distance at the surface location.

17. The method of claim 16, wherein receiving the measured temperature, the measured pressure, and the measured distance at the surface location comprises wirelessly transmitting, by the controller, the measured temperature, the measured pressure, and the measured distance to the surface location.

18. The method of claim 16, wherein:
the controller has a density that is lighter than the surrounding fluid;
the controller floats back to the surface location after the dissolvable gauge cutter has reached the specified depth and dissolved; and
receiving the measured temperature, the measured pressure, and the measured distance at the surface location comprises receiving the measured temperature, the measured pressure, and the measured distance from the controller after the controller has floated back to the surface location.

19. The method of claim 18, wherein the dissolvable gauge cutter is reversibly coupled to a second dissolvable gauge cutter made of a second alloy comprising magnesium and at least one of zinc, aluminum, iron, tungsten, nickel, manganese, or copper, and the method further comprises:
releasing the second dissolvable gauge cutter from the dissolvable gauge cutter after the dissolvable gauge cutter has reached the specified depth within the wellbore; and
dislodging, by the second dissolvable gauge cutter, solids from a second inner wall of a second tubular installed within the wellbore as the second dissolvable gauge cutter travels through the second tubular to a second specified depth within the wellbore to ensure a second minimum inner diameter of the second tubular, wherein the second dissolvable gauge cutter completely dissolves after reaching the second specified depth.

20. The method of claim 19, wherein the second minimum inner diameter is less than the first minimum inner diameter, the second specified depth is deeper than the first specified depth, and the second dissolvable gauge cutter dissolves at a slower rate in comparison to the dissolvable gauge cutter.

* * * * *